United States Patent
Lin-Hendel et al.

(10) Patent No.: US 9,508,097 B2
(45) Date of Patent: Nov. 29, 2016

(54) METHOD AND SYSTEM TO CONDUCT ELECTRONIC COMMERCE THROUGH MOTION PICTURES OF LIFE PERFORMANCE EVENTS

(71) Applicants: Catherine G. Lin-Hendel, Summit, NJ (US); Rudolf H. Hendel, Summit, NJ (US)

(72) Inventors: Catherine G. Lin-Hendel, Summit, NJ (US); Rudolf H. Hendel, Summit, NJ (US)

( * ) Notice: Subject to any disclaimer, the term of this patent is extended or adjusted under 35 U.S.C. 154(b) by 0 days.

(21) Appl. No.: 14/216,012

(22) Filed: Mar. 17, 2014

(65) Prior Publication Data

US 2015/0262278 A1 Sep. 17, 2015

Related U.S. Application Data

(60) Provisional application No. 61/800,808, filed on Mar. 15, 2013.

(51) Int. Cl.
*G06Q 30/06* (2012.01)
*G11B 27/28* (2006.01)
*H04L 29/06* (2006.01)

(52) U.S. Cl.
CPC ...... *G06Q 30/0623* (2013.01); *G06Q 30/0625* (2013.01); *G11B 27/28* (2013.01); *H04L 29/06027* (2013.01)

(58) Field of Classification Search
CPC ...... G06Q 30/00; G06Q 30/06; G11B 27/28; H04L 29/06027
USPC .......................................... 705/26.1
See application file for complete search history.

(56) References Cited

U.S. PATENT DOCUMENTS

| | | | | |
|---|---|---|---|---|
| 7,017,173 | B1 * | 3/2006 | Armstrong | H04N 5/445 348/E5.099 |
| 8,254,752 | B2 * | 8/2012 | Ryu | H04N 5/76 348/222.1 |
| 8,503,862 | B2 * | 8/2013 | Hsieh | G11B 27/28 386/241 |
| 2007/0240190 | A1 * | 10/2007 | Arseneau | H04L 29/06027 725/81 |
| 2014/0331264 | A1 * | 11/2014 | Schneiderman | H04N 21/278 725/92 |

* cited by examiner

*Primary Examiner* — Mila Airapetian
(74) *Attorney, Agent, or Firm* — Douglas L. Weller (57) ABSTRACT

Systems and methods for enabling a viewer of a motion art form to select an object of interest from within the motion art form are disclosed. The system includes a computing device configured to: receive at least one selection signal from at least one viewer; synchronize the at least one selection signal with an elapse time of the motion art form; and transmit the at least one selection signal to a destination.

38 Claims, 2 Drawing Sheets

METHOD AND SYSTEM TO CONDUCT ELECTRONIC COMMERCE THROUGH MOTION PICTURES OF LIFE PERFORMANCE EVENTS

CROSS REFERENCE TO RELATED APPLICATIONS

This application claims the benefit of U.S. Provisional Application Ser. No. 61/800,808 filed Mar. 15, 2013, entitled "Method and System to Conduct Electronic Commerce Through Motion Pictures or Life Performance Events" which is hereby incorporated by reference in its entirety.

BACKGROUND OF THE INVENTION

Field of the Invention

Information on objects including goods and services shown in motion pictures, including movies, TV programs, videos to be played on a TV or a computer, or views over the Internet, including short films and trailers distributed through the Internet is available today in a circuitous and limited form, separate from viewing experience. Brand names of well-known products recognizable to viewers can be pre-arranged to appear in a motion picture under a "placement" contract allowing motion picture producers to collect a placement fee from the manufacturer. Products which are not readily recognizable or have no brand insignia displayed prominently on the product are excluded from using this marketing channel to reach interested potential buyers. Numerous attractive creations by the set and costume designers of the production attract the attention and desire of the viewers, but there is no channel to indicate viewers' desire to purchase. The creative effort becomes a one shot deal, and the value and revenue that could be derived from the creations go to waste. Similarly with life performance events, the value and revenue potential of attractive costumes and accessories are not realized.

This invention presents a method and system which allow viewers of a motion picture and life performances to connect the viewing experience with easy access to further information regarding objects including goods and services shown in a motion picture or life performance, and links viewers to channels where they can purchase goods and services they find compelling in a motion picture or a life performance.

The present invention also provides a new and compelling channel of advertising for manufacturers, while concurrently providing additional revenue streams to motion picture and life performance producers. For the convenience of readers of this application, the term Motion Art Form is to be broadly interpreted and includes Motion Pictures, Life Performance Events and Media Presentations, which is also broadly interpreted to include movies, videos, motion pictures, motion picture advertising, digital recordings of life events, motion picture documentaries, personal video recordings, streamed presentations, animated films and all similar presentations of movement embodied in a medium.

Motion pictures are produced with an emotionally compelling story line, a high degree of artistic and attractive arrangements of scenes and locations with attractive furnishing, accessories and surroundings; with attractive actors wearing attractive clothes and accessories, driving attractive cars, visiting restaurants, hotels, and vacation destinations, living in or visiting beautiful homes with all the trappings of a home serving as back drops of scenes. All of the above combined with the emotionally compelling and entertaining story line; make motion pictures a potentially lucrative channel for marketing merchandises and services.

However, the present state of the art of commerce in motion pictures and life performances beyond ticket/viewing and video recording sales comprises only product placement and souvenir purchasing through separate channels. Products appearing in movies consists of only using product placements of already well known and easily recognizable products (such as automobiles, brand name watches, Coca Cola vs. Pepsi). In many motion pictures, producers can shop certain scenes to manufacturers and collect placement fees from manufacturers. Such manufacturers may use such scenes for further advertisement of the placed product, such as blogging about the product placement within a motion picture scene on its own websites in order to promote the product.

However, most goods and services cannot display brand insignia prominently on the goods, most are also not readily recognizable. Also, many compelling and attractive objects in a motion picture are produced by set and costume designers of the motion picture. Obviously, product placement does not work for such cases. The most generally desired and sellable goods including jewelry, clothing, personal and home accessories are therefore left out of the product placement marketing channel. Furthermore, product placement still does not provide purchasing venue to a viewer. A viewer needs to independently find a dealer or store carrying the desired product, if exists, to conduct purchasing transaction.

BRIEF DESCRIPTION OF THE DRAWINGS

The accompanying drawings are included to provide a further understanding of the disclosed embodiments. In the drawings, like numerals represent like elements, and.

DETAILS OF THE INVENTION

This invention provides an automated, effective, and convenient way of electronically accessing information and purchasing venues for compelling objects including goods, services and service locales that are featured in a motion picture by tagging a scene which contains an object of interest to the viewer. Means for a viewer to comment electronically on a scene or an object in the scene the viewer has tagged to review are also provided. Making such a channel available opens a new and lucrative revenue stream for the motion picture industry as well as for the makers and distributors of goods and services. It also has the potential to generate additional buzz for the motion picture and the actors and other production team members, leading to increased box office revenues. The invention can also be applied to live entertainments such as Broadway shows, operas, and ballet performances and their recordings. Furthermore, if a costume or accessary designed for the motion picture by the set designer or costume designer of the motion picture attracts substantial recorded positive attention in the viewer community through this invention, the costume or accessary can be licensed to a manufacturer to make into commercially available products for additional revenue, and made available for electronically conduct purchase transaction through this invention. In the prior art, such licensing deals are done either arbitrarily or through sampling of surveys or focus group, and the purchasing channel are entirely separate from the viewing experience. This invention provides a recorded, countable number of viewer interests and comments to substantiate decisions. The purchasing venue is linked to the motion picture or the life performance.

This invention also enables talented costume designer, set designer and the production studio to get more viewer comments and "bang for the buck" of the beautiful productions of their artistic creation, including clothing, jewelry, room furnishing, dinning ware, and accessories, to be available to viewers in auctions, or reproduced in larger quantities for purchase. Viewer survey or pre-order can be conducted through the information pages queried, or on the catalog when an object thumbnail is queried.

Figure 1:
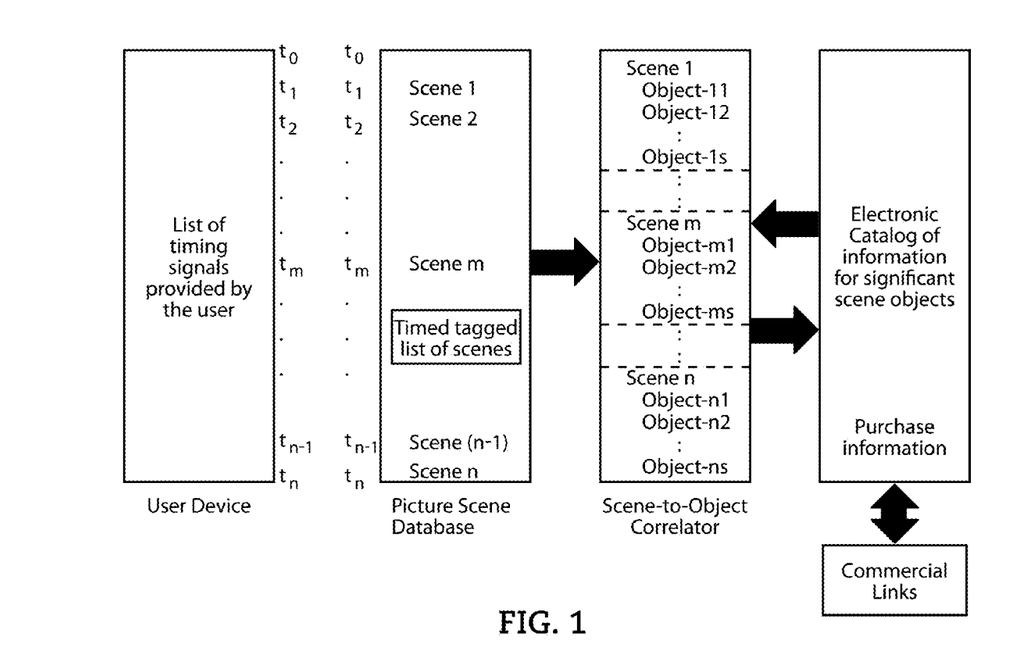
FIG. 1 illustrates an aspect of an exemplary embodiment of the present invention.

This invention provides a method and system to enable a viewer to electronically select and tag scenes while watching a motion picture or a live performance using a timing and tagging device. The timing indices of the tagged scenes are stored in a user file as shown in FIG. 1. At a later time, the viewer can open his user file containing the indices of tagged scenes, select a tagged scene, through an electronic data network, access the scene, or replay a segment containing the scene. Through the scene, the viewer can query information related to an object of interest appearing in the scene, object by object, and scene by scene. Information of interest related to objects, such as goods, services, and service locales appearing in a motion picture, as well as their purchasing venues, are stored in a database, and linked through an electronic data network to the viewer's personal depository of his selected and tagged scenes. The viewer can thus review a tagged scene through his personal depository of tagged scenes, select an object of interest from the scene, and access information regarding, and purchasing venue of the object. Alternately, a directory of available products and services featured in a motion picture can be made available to a viewer. The viewer can then access the scenes where a product or service that interests him appears. Alternately, manufacturer who placed their products in motion pictures can put the scenes in its product database, and allow a potential buyer to access scenes or segments of the motion picture where the product appears. Alternately, the present invention enables a user to search for merchandise or brands in a motion picture. If the search determines that the merchandise or brand was indeed used in a scene of the motion picture, an image of the scene is shown. If desired, a motion picture segment involving the scene can also be played. An additional embodiment is to compile a merchandise in scenes available for sale, and motion picture scene database, which would allow users to search for any particular merchandise to see where the merchandise has appeared in a motion picture, or a number of motion pictures, display thumbnails of scenes and names of motion pictures that the merchandise has appeared in, and allow users to access the scene in detail, or a segment of the motion picture involving the scene, as well as detail information related to the merchandize and its purchasing mechanism.

Following the linking of products with motion picture scenes, additional information regarding further details or purchase venues related to the selected products and services may be recalled and displayed if requested. On customer request, the system can then provide a mechanism to directly conduct the purchase transaction, or transfer the customer to a portal or manufacturer site which offers the product selected by the viewer for purchase.

The method and system described in this disclosure provides motion picture makers with the potential of a substantial additional revenue stream beyond conventional box office receipts and video sales and rentals. The invention on the other hand, offers manufacturers of products and providers of services added exposure through a compelling marketing and sales venue. Thirdly, the present invention provides viewers of motion pictures a tool, system and method to conveniently tag scenes containing objects the viewer finds compelling and wishes to attain more information, or to acquire. Alternately, short films can be produced with a story line and compelling actors for the purpose of promoting and selling products on TV or over the Internet.

A database which is used to manage the linking of products to scenes can be queried to allow motion picture viewers who have tagged specific scenes in a motion picture to link to products in those scenes.

Alternatively, a database which is used to manage the linking of products to scenes can be queried to allow key word searches or category browsing to link selected products to scenes in movies or videos where those products appear. These scenes may then be shown by static images or by playing a segment of the motion picture containing the scene. The scene may be played as originally filmed, or may be shown with the viewer selected product highlighted.

Once the connection between scenes and products is made, a link to a commercial page may be offered to allow purchase of the product. The information about the scenes and products is stored in database and presented to the viewer upon request. The links linking back to scenes and products tagged by the viewer are captured in a viewer file indexed by the film title in a viewer folder, so that a viewer can replay the scenes and object or product information at a later time, as frequently as desired. Purchasing records can also be stored in the viewer folder tacking all viewer purchases through this channel.

The scene preference of the viewer (who has been identified) or the product interest of the viewer may be stored and tracked by a database in a viewer profile and retained for further marketing analysis and use. Statistical information on viewer selections, comments, and purchases can be used for future productions of motion pictures and goods and services.

This Invention provides a marketing channel for a broad range of products and services which has not been available. The availability of such a channel provides additional revenue potential for motion picture and life performance studios, as well as for manufacturers of goods and providers of services.

The invention separate product information from the compelling motion picture scenes, even if the motion picture is made for the purpose of show casing the products appearing in the motion picture. By viewer initiated tagging of scenes and objects compelling to the viewer, product information of objects appearing in tagged scenes is made available to the viewer. This becomes viewer-pull information dissemination, satisfying viewer desire and demand, avoiding the pitfall of a conventional advertisement pushing products, which often turns off potential buyers before the product information can get across.

In one implementation, the linking of scene to product information is attained by the customer tagging a scene during the watching of the movie with the tagged scene being retained for later review. A static image of the scene or a short clip of the scene allows the tagging of the actual item of interest, identifying the product, allowing additional information to be displayed or purchase information to be provided.

In another implementation, a viewer may be interested in a given product or a given class of products and search the database for occurrence of such items in one or multiple scenes in one or multiple movies. A search function finds these occurrences and provides the information to the viewer. The viewer chooses to view a static image of the scene or a short clip of the scene containing the item, or maybe viewing both.

The invention describes methods which allow a motion picture or life-performance viewer to tag a scene and query for information relating to that scene and objects appearing in the scene to be provided later, all without disrupting the enjoyment of the viewing experience, or disrupting the viewing experience of others in a theater environment.

The invention also describes methods by which a customer who is already interested in purchasing a certain item (or a class of items) to find scenes in movies which feature that item or like items. After such scenes are found, they are made available to the customer for viewing in either original form, or with the item of interest highlighted.

The capability to connect audiences to merchandise on the screen has the potential of becoming a lucrative market for products and services. With an automated, effective, and convenient way of accessing product information and purchasing venues for compelling products and service locales used in the motion picture shown as well as on its advertising trailer, a lucrative revenue stream as well as additional buzz can be had for the motion picture and performance industry as well as the producers of products and services.

In one preferred implementation of this invention, individual viewers of a movie or video capture scenes which contain objects or services of interest by time-tagging the scenes using a device described in this invention, or an application program loaded to a smartphone, a tablet computer, or a personal portable networkable data and communications device. Scenes can be selected by pressing a button on a viewer device, or touching a designated area on a touch screen of a user device, at the time of the scene. This viewer device can be a smart phone or other portable intelligent devices such as a tablet computer with an appropriate application, or a small device supplied by a theater. It can also be a device imbedded in an arm rest of a seat with wired or wireless connection to a server database containing scenes of the motion picture indexed by the time each scene appears in the motion picture after Time Zero ($t_o$), the starting time of the motion picture or life performance. The viewer tagging device is synchronized to the motion picture or the life performance. The scenes in this database are pre-processed. Each significant object can be identified by the bit-map area the object occupies in the scene, or as similarly described in U.S. Pat. No. 7,096,426. Information concerning the object and purchasing channel of objects is linked with the Bit-Map area occupied by the object. When a viewer touches, or places a cursor onto the Bit-Map area occupied by the object in the scene, including making a gesture to select the object, the information and purchasing venue of the object is brought forth from a database to display on a viewer view screen.

A theater can provide a device with a time-synchronization and time-stamp capturing application program, enough memory for capturing data, and a communications port to each viewer. The application on the device performs the time-synchronization function when a motion picture or a life performance begins through the communications port and signal sent from the theater server. When a viewer touches a touch spot on a touch pad or touch screen whenever the viewer sees a compelling scene in which a compelling object appeals to the viewer, the application on the device performs the scene time-stamp capturing function. The time-stamps of the tagged scenes are stored in a viewer folder indexed to the motion picture (or the life performance) the viewer is watching, and linked to related databases. If the device is to be collected after viewing event at the theater, the viewer file can be automatically downloaded to a viewer's personal device, or emailed to the viewer. The device can also be installed on an armrest or any suitable location of each seat in the theater.

This separate device can link the identity of the viewer with the device using a number of methods well-known by those skilled in the art. For example, linking can be performed through a blue-tooth connection between the timing device and a smart device owned and carried by the viewer to download the viewer folder to a viewer's personal device, and the viewer's identity to the theater server which retains the viewer folder. Or, a code identifier on the timing device sent to the viewer or downloaded to the viewer's personal device allows a viewer to link to his selected scene-time-stamp list by providing the list on a theater web-site. The title of the movie, the code identifier, the date and time the movie was watched, and the theater it was watched in can be all stored in the viewer folder. As soon as the list of scenes selected by a viewer is sent to the viewer, the viewer can access scenes selected by the user through a web-site containing the database related to the motion picture or the life performance watched, or a portal containing many motion pictures and/or life performances. Alternatively, the selected scenes and video segments including the selected scenes can be downloaded to the user's smart device (phone or tablet) or to his home computer. Alternatively, the scenes may be sent to the user through e-mail by sending actual scene images, or by providing links to the scene images or short scene clips. The user may then manipulate those images or short videos similar to image manipulation available on smart devices, such as changing the magnification or scrolling between sections of the image (or moving to another image).

Timing synchronization and "click or touch to tag" programs can also be installed as an application to a viewer's personal device, such as a smart phone or a tablet computer, which contains its own communications port and data storage.

If the scene-tag timing is somewhat off and the scenes tagged and displayed for the viewer when the viewer access the viewer folder are not exactly the scene the viewer intended to select, this can be compensated by extending the time periods bracketing the scene timing tags, making additional scenes extending backward and forward in timing available to the viewer in a film clip, time length selectable by the user, also providing options to view scene by scene of the film clip. In other words, the scenes in the clip may be shown as a sequence of static images, or as a short (few second) video, during which the viewer can click on the mis-tagged scene originally intended.

To avoid a whole movie being stitched together from such scene-tags, scenes may be slightly offset in x and y direction at random so they cannot be stitched together without periodic and annoying frame jumps. For yet additional protection, a movie studio may limit the number of clicks available for commercial tagging so the entire movie could not be stitched together.

After a tagged scene is displayed for the user, and the item of interest is found, the user can now select that item by either moving a cursor over it or by touching the location of the item on a touch-sensitive screen with a finger or stylus. This action may display first level information about the item on the user's screen. If the user requires additional information, or if the user would like to investigate additional information or alternate options relating to the purchase of the items of interest, further action such as clicking, double clicking on the item (or double touching on a touch-sensitive or stylus sensitive screen) will notify the database of that interest and provide that detailed information to the user's display device. Other methods of indicating interest in receiving additional information are obvious and numerous and shall be considered as covered under this disclosure (such as, a long touch, or a second single touch on the first level information box).

The interface between the viewer and the database containing scenes, product information and other relevant marketing materials may be a web-site displaying the additional relevant information requested. The viewer may decide not to proceed with his interest immediately, may wish to purchase the item outright, or may choose to put the item on a save-list before leaving the web-site, to be reviewed and mulled over, or to discuss with a significant other at a later time. We wish to point out that it is not necessary to provide only commercial data, but that "interesting to know" information regarding the movie ("the making of"), or the set or costume designer's bios, or the director and various actors' bios and credentials, may also be provided in order to encourage people to use the service. "Interesting to know" information may be connected to multiple frames or scenes over a given time period and needs not to be frame or scene specific.

In addition to the merchandise actually used in the scenes, the data-base may offer alternate products or services that may inspire a viewer's interested through the web-site. These recommendations may consist of general suggestions (for first time viewers) or may be targeted recommendations (for repeat visitors based on previously provided information), based on preferences as determined by product correlations based on previous scene selections, viewing habits or actual purchases.

Alternatively, the database may point the viewer to other movies where the item, similar items, or a class of items, for example, by the same set designer or costume designer were used. Or movies by the same director, same genre, or movies where actors the viewer has queried also appears. Upon request, the scenes in these other movies can be shown to the viewer.

In another realization of the invention, the database may suggest and display products appearing in selected movies that are specifically available for purchase. This database will be searchable via key words, or browsed by categories. Once a product is selected, the database will signal the web-site to show an image of the scene within which the product appears, or to play a short scene from the movie showing the product. The scene may play as originally filmed, or may (as a selectable option) highlight the product of interest. The selection of scenes by specific viewers can be tracked and retained by time mark for subsequent market analysis or product promotion purposes.

For scenes that were selected by watching a movie in the movie theater, the review of the scenes may be remotely either on the smart device (phone), the home TV (especially with new web-connected TV), or the home PC.

For scenes that were selected by watching a movie on DVD (home video), the review of scenes selected may be shown on the main video screen (not just on the smart device). The review of the selected scenes may be offered as an option after the conclusion of the video.

When watching regular TV, an application on smart phones (using text input or voice recognition) can respond to relevant questions relating to what is shown on the screen. For example, a viewer may ask: "Who made the suit that Anderson (or O'Reilly) is wearing in today's show?" The application on the smart device then finds the answer and provides the desired information, including purchasing links.

The application may also track the channel that is currently being watched (via blue-tooth) and may respond to specific question ("who made that couch I see"?) and knows what channel and show the user is watching (ex.: the David Letterman show) and therefore has all the information necessary to answer the question, without requesting additional input.

Figure 2:
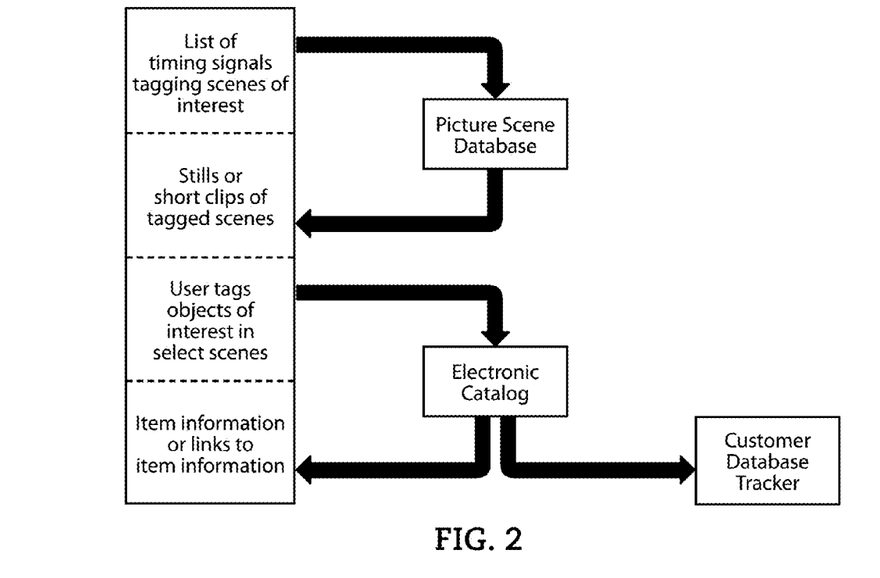
FIG. 2 illustrates an aspect of an exemplary embodiment of the present invention.

In the following, we describe in detail, several examples of preferred methods for implementing this invention:

An electronic catalog of significant objects appearing in a motion picture is created along with the motion picture. The catalog includes information of interest regarding these objects, including purchasing mechanism. Alternatively, the catalog can contain links to the information of interest regarding these objects. A database containing detailed information on each significant object, scenes involving significant objects, and segments of the motion picture (film clips) near the scenes where those objects appear, is also created along with the catalog and interlinked with the catalog. Each scene in the database is cross indexed to objects appearing in the scene, and each object is also indexed to all scenes the object appears in. When a scene is tagged or selected by a viewer, the collection of the thumbnails of all significant objects appearing in the scene can be presented to the viewer for review and selection. Each thumbnail contains a link to detailed information about the object, and if available for purchase, also price and a purchasing link within the information screen. A place for inviting and receiving viewer comments can be included. The online catalog can be made available on a web site specific to the motion picture, a portal side dedicated to the promotion, blogging, and merchandising of all motion pictures, and/or linked to a general merchandise portal such as Amazon.com. The various databases and the flow of data and information between is shown schematically in FIG. 1 and FIG. 2.

Figure 3A:
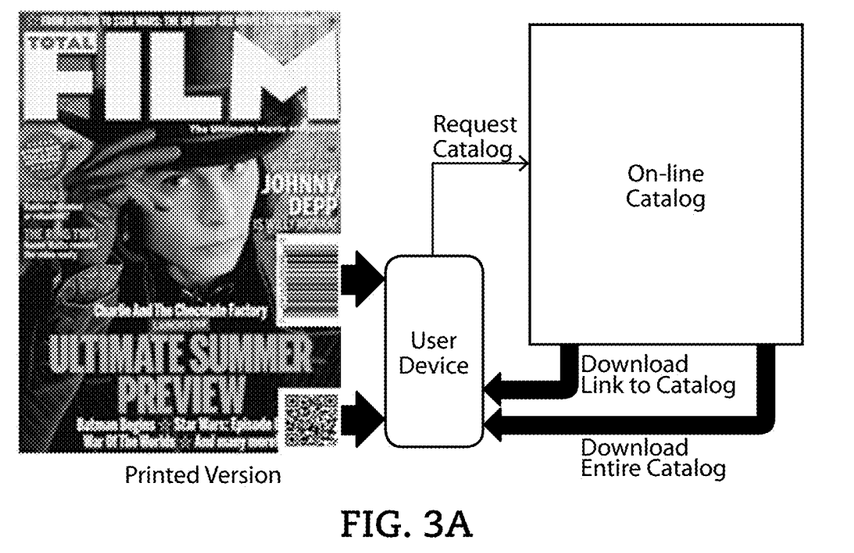
FIGS. 3a and 3b illustrate an aspect of an exemplary embodiment of the present invention.

A print version of the catalog can also be created, to be left at stores or newsstands. The printed catalog can contain a one or two dimensional bar code, which when scanned into a user device such as a smart phone or a tablet computer, a network connection is made, the user identified and recorded, and an electronic version of the catalog or a link to the online catalog and database is loaded to the user device. A URL address can be printed in the paper catalog, such that a potential viewer can enter the URL into a browser on a device of his choice to access the online catalog and database. This is shown in FIG. 3a.

Figure 3B:
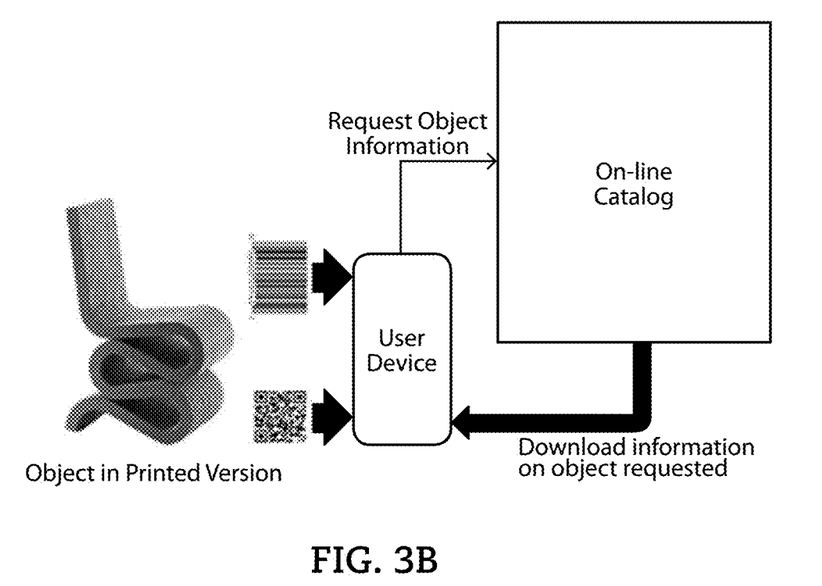

Alternatively, items shown in the print version of the catalog can contain a one or two dimensional bar code, which will link to the information of the object of interest on-line or loaded to the user device as shown in FIG. 3b.

Alternately, an attractive scene from a motion picture or a life performance along with the catalog and database access bar-codes maybe placed on printed journals, newspaper, magazines or on Internet advertisement, which also allow a viewer to scan the bar-codes and access the catalog and database of the motion picture or life performance.

Alternately, a printed card, or a flyer, or a pamphlet promoting a motion picture having a one-dimensional bar-code or a two-dimensional bar-code can serve as a conduit to entice a potential viewer to scan either of the bar code to link to and access the online catalog and database of the motion picture.

The entire electronic catalog or alternatively a link to the electronic catalog can be downloaded to a viewer device before, during, or after ticket purchase for viewing of the motion picture. This can be done with viewer permission either case-by-case (by motion picture) or by generic permission for all motion pictures the viewer will see after granting the permission. The catalog contains an application that works two ways: 1, when only the link to an online catalog is loaded into a viewer device, the download application creates an icon of the link on the viewer's device screen. When the viewer accesses the icon of the link to the catalog on the viewer device screen, a network connection is made, and the viewer is linked to the catalog online, where the viewer can browse the catalog, view thumbnail pictures of objects, select to see scenes related to an object, and select to see further information and/or make purchase; 2, when the entire catalog is loaded to the viewer device, the download application similarly creates an icon on the viewer's device screen. The viewer can then browse the catalog off line. When he selects an object that interests the viewer, the application queries the viewer whether the viewer wishes to view detailed information and scenes related to the object "Now" or "Later." When a viewer's response is "Now," a network connection is made to the online catalog and the database. When a viewer's response is "Later," the Application collects the indices of objects selected by the viewer in a file. After the viewer has completed the object selection process, for example during watching an in-flight motion picture video, and decided to access information and scenes related to the selected objects, for example, after completion of the flight when within range of and with access to a commercial network, or when at home within the reach of a free home Wi-Fi network, the Application makes a network connection and presents the data to the viewer as requested by the viewer.

Another embodiment is to download a motion picture scene tagging application to the viewer device. Using the application, a viewer can tag scenes he wants to review later. The indices of the tagged scenes are stored in a user data folder with an icon. When the icon is accessed, the application makes a connection to the database that contains the scene information and related film-clips, from which the viewer selects the objects of his interest.

This method not only provides a venue for effective and convenient electronic commerce through a motion picture, it provides compelling advertising for the motion picture and creates additional buzz about the motion picture.

The same method can be used in live performances such as a Broadway Production, an opera, a play, a ballet. The electronic recording of scenes, as well as electronic database regarding significant objects in the live performance may be created during the production and rehearsal period, before opening of the live performance. In the future, the electronic recording of the scenes may be done live, with automated recognition of significant objects in real time and automated linking in real time to the electronic database of significant objects that was generated prior to the performance.

An Application can also be downloaded to a viewer device, such as a smartphone or a tablet computer when the viewer make an inquiry regarding information about a motion picture, including show location or show time, or on which site he can watch online, or what is the movie all about, or make inquires about the availability of the Application, or when he purchases a ticket, or enters the theater, or accesses a motion picture online, by presenting to the viewer information about the functions and benefits of the Application, and seeking the viewer's permission to download. The Application contains a touch spot or a click button, a timing synchronizer, and a structured database to keep record of viewer actions. When the viewer activates the Application and begins to watch a motion picture, the Application synchronizes with the motion picture and creates a folder for the motion picture and names the folder with the name of, or an abbreviation of the motion picture. When the viewer sees a compelling scene containing compelling objects that he wishes to obtain access for further information, the viewer touches the touch spot or clicks the click button, and the Application creates a tag index of the scene and deposits it into the folder. The preferred method of implementing the indexing is by the exact time after Time Zero ($t_o$)—the beginning of the motion picture—that the scene appears. Alternately, when a motion picture is activated to begin to play, it sends a signal to turn on the Application, and time synchronizes the Application to the motion picture.

In the case of a viewer purchasing a ticket at a theater, or entering the theater, a dedicated scene tagging device can be given or sold to the viewer, if the viewer does not wish to have the Application loaded to his own device. The tagging device has a touch spot, or a push button, with which the viewer can tag a scene that contains an object that the viewer desires to learn further information at a later time. The device collects timing indices of the tagged scenes in a user file, and contains an application to link the user file to the interlinked online scene and film clip database and object catalog described above. When the connection is made, the viewer can review the scenes and film clips he had tagged on this device, and make purchases on this device. When the session terminates, the viewer can choose to load the user file from the external device to his own personal device. The viewer can also choose to load the Application onto his own personal device after the viewer gain confidence in the safety and operation of the Application.

An additional embodiment of the invention is the method to tag an object appearing in a scene from viewing the scene. The bit-map area of each significant object is mapped out (or traced-out, or cut out) and identified and enabled as an active link to the information and data in the database related to the object. When a viewer touches an area on the scene that is occupied by the image of an object, or moves a curser to the area, or performs any other gesture to indicate interest in the object, a short description of the object appears. When an additional gesture is made, the link is activated and more detailed information is brought to the display screen from the database. Alternately, the detailed information maybe brought forth upon a first gesture. If the object viewed is commercially available, a purchasing mechanism is also provided. A viewer comment area can be implemented to display on the display screen to invite and receive comments from the viewer.

Alternately, the indexing of an object appearing in a scene can be accomplished by image recognition, and tagged and enabled accordingly to link to where the information and data related to the object is stored in the database.

For live performance events, the above preferred methods of implementation can be equally applied. In this case, a digital filming maybe conducted during the event, or during dress rehearsal. When the recording at the life performance begins, a synchronization signal is sent to the timing and tagging Application on viewer devices and theater devices provided to viewers. Following the synchronization, the same time tagging of scenes containing objects of interest works similarly as the time tagging method described before. For recording during dress rehearsal, made available before official opening of the life performance, the object catalogs and object, scene, and clip cross indexed database can be made available to viewers who query for information about the show, opera, musical, or ballet, as described before for motion pictures.

Before the opening event of a live performance, catalogs and databases can be produced by recording the performance in segments during dress rehearsals, and made available similarly as described before to the general public, or to the patrons of the theaters for pre-opening marketing, advertising, and to create a buzz for the upcoming performances.

What is claimed is:

1. A system for enabling a viewer of a motion art form to select an object of interest from within the motion art form, the system comprising:
    a viewing device on which the motion art form is viewed;
    a picture scene database that indexes scenes of the motion art form with elapsed time from a beginning of the motion art form;
    a scene-to-object correlator that correlates objects to scenes of the motion art form;
    a selection device that is configured to receive at least one scene selection signal from at least one viewer using the selection device during a time when the electronic display is displaying the motion art form;
    a computing device that uses the indexed scenes within the database to identify at least one scene indicated by the at least one scene selection signal, the computing device being configured to:
        create a folder for the viewer signified by the viewer's use of the selection device,
        tag the folder to identify the motion picture art form and an identity of the viewer, and
        store in the folder the identification of the at least one scene indicated by the at least on scene selection signal;
    wherein the computing device makes the folder accessible to the viewer and enables the viewer to conduct at least one of the following:
        review the specific selected scenes,
        view information concerning the selected scenes,
        select a specific object present in a selected scene,
        attain information related to a selected object from a selected scene,
        attain information and a link related to purchasing a selected object from a selected scene, and
        purchase a selected object from a selected scene.

2. The system of claim 1 wherein the viewing device and the selection device are both within a mobile computing device.

3. The system of claim 1, wherein the networked computing system comprises a networked computer.

4. The system of claim 1, wherein the viewing device is a television, and the selection device is a remote controller.

5. The system of claim 1, wherein the selection device is a portable device supplied by a theater.

6. The system of claim 1, wherein the selection device is coupled to a seat in a theater.

7. The system of claim 1, wherein the folder is within the selection device.

8. The system of claim 1, wherein the folder is within a server.

9. The system of claim 1, wherein the motion art form is a media presentation.

10. The system of claim 1, wherein the motion art form is a life event coupled with a recording and viewing device.

11. The system of claim 9, wherein the motion art form is a movie.

12. The system of claim 9, wherein the media presentation is a recording of a performance.

13. A system for processing viewer transmissions related to a motion art form, the system comprising:
    a picture scene database that indexes scenes of the motion art form with elapsed time from a beginning of the motion art form;
    a scene-to-object correlator that correlates objects to scenes of the motion art form;
    a computing system configured to receive viewer input in the form of at least one selection signal;
    a computer program embodied on a non-transitory storage medium, the program, when executed by at least one hardware processor associated with the medium implements:
        querying the picture scene database for information related to the viewer transmission and transmitting the information to a destination;
        creating a folder for a viewer signified by a selection device registered to the viewer that records an identity of the viewer, an identity of the motion art form, the at least one selection signal and continues to receive viewer generated selections marked by the time-marks of the viewer using the selection device to signify the viewer selected scenes of the specific motion art form and each time-mark is synchronized with the specific frame of the selected scene in the motion art form;
        wherein the folder is accessible by the viewer after viewing the motion art form, and is configured to enable the viewer to conduct at least one of the following:
            review the specific selected scenes,
            view information concerning the selected scenes,
            select a specific object present in a selected scene,
            attain information related to a selected object from a selected scene,
            attain information and a link related to the purchasing of the object, and
            purchase a selected object from a selected scene; and
    a storage medium capable of storing the information of the user interactions with the selected scenes and actions through the scenes accruing in a viewer folder indexed to the viewer and the motion art form.

14. The system of claim 13, wherein the received viewer input is a file containing the entirety of viewer selection signals recorded during the process of viewing the motion art form.

15. The system of claim 13, wherein at least one viewer selection signal is received in real time and stored in a folder in the computing system indexed with the identity of the viewer and the identity of the motion art form.

16. The system of claim 13, wherein the viewer selection signal is the time stamp of a scene containing at least one object of interest to the viewer.

17. The system of claim 13, wherein the information queried in the database includes a still scene selected by the viewer containing at least one object of interest to the viewer.

18. The system of claim 13, wherein the information queried in the database includes a segment of the motion art form starting from a time before a selected scene and ending at a time after a selected scene.

19. The system of claim 13, wherein the destination is a networked computing device and the information transmitted to the computing device includes a selection mechanism for allowing a viewer to initiate a commerce application with respect to at least one object.

20. The system of claim 19, wherein the commerce application relates to purchasing.

21. The system of claim 19, wherein the commerce application relate to renting.

22. The system of claim 19, wherein the commerce application relates to sharing or gifting.

23. The system of claim 13, wherein the destination is a computing device and the information transmitted to the computing device includes a mechanism for enabling a viewer to query for more information.

24. The system of claim 13, where the destination is a computing device and the information transmitted to the computing device includes a mechanism for enabling a viewer to refine a selection of objects to query for more information.

25. The system of claim 1, wherein the computing system is a server in a theater showing the motion art form.

26. The system of claim 1, where in the viewer-specific folder contains a subfolder which tags a specific motion art form viewed by the viewer and records the viewer selections of scenes in this motion art form, as well as subsequent viewer interactions with these scenes, including selections and purchasing of objects from selected scenes.

27. The system of claim 13, wherein the computing system is a server in a theater showing the motion art form.

28. The system of claim 13, wherein the selection device is coupled to a seat in a theater.

29. A method for enabling a viewer of a motion art form to select an object of interest from within the motion art form, the method comprising:
creating a picture scene database that indexes scenes of the motion art form with elapsed time from a beginning of the motion art form;
creating a scene-to-object correlator that correlates objects to scenes of the motion art form;
receiving at least one scene selection signal from at least one viewer using a selection device;
using the picture scene database to synchronize the at least one scene selection signal with an elapse time marker of the motion art form of t-he-aflame of the viewer selected scene; and
transmitting the at least one scene selection signal to a destination;
in response to receiving the first viewer generated selection, the method further comprises the steps of:
creating a folder for the viewer signified by the viewer's use of the selection device, wherein the folder is tagged with the specific motion picture art form and an identity of the viewer, and continues to receive viewer generated selections marked by the viewer signifying the viewer selected scenes of the specific motion art form using the selection device;
wherein the folder is accessible by the viewer after viewing the motion art form, enabling the viewer to conduct at least one of the following:
review the specific selected scenes,
view information concerning the selected scenes,
select a specific object present in a selected scene,
attain information related to a selected object from a selected scene,
attain information and a link related to purchasing a selected object from a selected scene, and
purchase a selected object from a selected scene.

30. A method for processing viewer transmissions related to a motion art form, the method comprising:
creating a picture scene database that indexes scenes of the motion art form with elapsed time from a beginning of the motion art form;
creating a scene-to-object correlator that correlates objects to scenes of the motion art form;
receiving viewer input in the form of at least one selection signal;
querying a database for information related to the viewer transmission and transmitting the information to a destination;
creating a folder for a viewer signified by a selection device registered to the viewer that records an identity of the viewer, an identity of the motion art form, the at least one selection signal and continues to receive viewer generated selections marked by the time-marks of the viewer using the selection device to signify viewer selected scenes of the specific motion art form and each time-mark is synchronized with the specific frame of the selected scene in the motion art form;
wherein the folder is accessible by the viewer after viewing the motion art form, and enables the viewer to conduct at least one of the following:
review the specific selected scenes,
view information concerning the selected scenes,
select a specific object present in a selected scene,
attain information related to a selected object from a selected scene,
attain information and a link related to the purchasing of the object,
and purchase a selected object from a selected scene; and
storing the information of the user interactions with the selected scenes and actions through the scenes accruing in a viewer folder indexed to the viewer and the motion art form.

31. The system of claim 1, wherein the viewer conducts the selection of the specific object present in the selected scene directly and graphically from the scene by pointing at the specific object with a pointing device and signaling a selection.

32. The system of claim 1, wherein the viewer conducts the selection of the specific object present in the selected scene by selecting the specific object from a list of objects presented for selection from the selected scene.

33. The system of claim 13, wherein the viewer conducts the selection of the specific object present in the selected scene directly and graphically from the scene by pointing at the specific object with a pointing device and signaling a selection.

34. The system of claim 13, wherein the viewer conducts the selection of the specific object present in the selected scene by selecting the specific object from a list of objects presented for selection from the selected scene.

35. The method of claim 29, wherein the viewer conducts the selection of the specific object present in the selected scene directly and graphically from the scene by pointing at the specific object with a pointing device and signaling a selection.

36. The method of claim 29, wherein the viewer conducts the selection of the specific object present in the selected scene by selecting the specific object from a list of objects presented for selection from the selected scene.

37. The method of claim 30, wherein the viewer conducts the selection of the specific object present in the selected scene directly and graphically from the scene by pointing at the specific object with a pointing device and signaling a selection.

38. The method of claim 30, wherein the viewer conducts the selection of the specific object present in the selected scene by selecting the specific object from a list of objects presented for selection from the selected scene.

\* \* \* \* \*

UNITED STATES PATENT AND TRADEMARK OFFICE
CERTIFICATE OF CORRECTION

PATENT NO. : 9,508,097 B2  
APPLICATION NO. : 14/216012  
DATED : November 29, 2016  
INVENTOR(S) : Catherine G. Lin-Hendel et al.

Page 1 of 1

It is certified that error appears in the above-identified patent and that said Letters Patent is hereby corrected as shown below:

On the Title Page

(54) Title, Line 3, the phrase "OF LIFE" should read --OR LIVE--.

In the Specification

Column 1, Line 3, in the Title, the phrase "OF LIFE" should read --OR LIVE--.
Column 2, Line 61, the phrase "accessary" should read --accessory--.
Column 2, Line 65, the phrase "accessary" should read --accessory--.
Column 5, Line 45, the phrase "arm rest" should read --armrest--.

In the Claims

Column 13, Line 55, the phrase "t-he-aflame" should read --a frame--.

Signed and Sealed this  
Sixth Day of June, 2017

Michelle K. Lee  
*Director of the United States Patent and Trademark Office*